United States Patent
Zimmet et al.

(10) Patent No.: US 7,768,947 B2
(45) Date of Patent: Aug. 3, 2010

(54) MAINTAINING COMMUNICATION CONTINUITY

(75) Inventors: Carol Sue Zimmet, Boxborough, MA (US); Patrick Joseph O'Sullivan, Ballsbridge (IE)

(73) Assignee: International Business Machines Corporation, Armonk, NY (US)

( * ) Notice: Subject to any disclaimer, the term of this patent is extended or adjusted under 35 U.S.C. 154(b) by 233 days.

(21) Appl. No.: 11/967,926

(22) Filed: Dec. 31, 2007

(65) Prior Publication Data
US 2009/0168644 A1  Jul. 2, 2009

(51) Int. Cl.
*H04J 3/14* (2006.01)
*H04L 12/26* (2006.01)
*H04L 12/28* (2006.01)
*H04L 12/56* (2006.01)

(52) U.S. Cl. .................. 370/255; 370/351; 709/203; 709/206; 709/207; 709/239

(58) Field of Classification Search .............. 370/225, 370/401; 709/203, 206, 209, 225, 351, 401, 709/239
See application file for complete search history.

(56) References Cited

U.S. PATENT DOCUMENTS

| 6,253,249 B1 * | 6/2001 | Belzile | 709/249 |
|---|---|---|---|
| 6,510,219 B1 * | 1/2003 | Wellard et al. | 379/221.01 |
| 6,934,258 B1 * | 8/2005 | Smith et al. | 370/238 |
| 7,406,501 B2 * | 7/2008 | Szeto et al. | 709/206 |
| 2005/0281204 A1 * | 12/2005 | Karol et al. | 370/248 |
| 2009/0172116 A1 * | 7/2009 | Zimmet et al. | 709/206 |

* cited by examiner

*Primary Examiner*—Chi H Pham
*Assistant Examiner*—Ahmed Elallam
(74) *Attorney, Agent, or Firm*—Holland & Knight (57) ABSTRACT

A plurality of communication channels are monitored to detect a failed communication channel. In response to detecting the failed communication channel, failover instructions are generated concerning an alternative communication channel. The failover instructions are provided to one or more client electronic devices.

16 Claims, 5 Drawing Sheets

MAINTAINING COMMUNICATION CONTINUITY

BACKGROUND OF THE INVENTION

This disclosure relates to messaging systems, and more particularly to maintaining communication continuity in messaging systems.

Communications systems, such as email and instant messaging, are considered to be mission critical by many corporations. That is, the use and availability of such communications systems are deemed to be essential for the effective operation of the company. Given the importance of these mission critical systems, companies often devote significant resources to developing and implementing various plans, protections, and measures to ensure that the important communications systems remain up and running, with the goal being 100% (i.e., continuous) up time and availability of services.

For example, often redundant servers may be used for a given communication system, such as email. In the event of a failure in one server, the redundant server may be employed to ensure and maintain the availability of the email system. Additionally, the redundant servers may be geographically distributed. In the event of a power failure, such as a city-wide power failure, while one server may be affected, the geographically distributed servers may continue to operate. The unaffected email servers may assume the responsibility of maintaining email communications for the company until the power failure is overcome.

Further, separate servers may be used for different communications systems. An email system may be deployed on a first server, while an instant messaging system may be deployed on a second server. In the event of a failure of one server, such as an email server, the instant messaging server may continue to operate. The hope is that, even though email communications may be interrupted as a result of the failure of the email system, at least instant messaging communications may remain available.

While the various protections and measures implemented to ensure continuous operation of mission critical systems may be largely effective, failures and losses still occur. Additionally, even though alternative communication systems may be available (e.g., instant messaging may be used in the event of an email failure), the alternative systems may be less desirable. The ability to utilize alternative communications systems in the event of a failure in one communication system requires the availability of the alternative system, and an awareness by each party to the communication that one of the communication systems has failed.

BRIEF SUMMARY OF THE INVENTION

In a first implementation, a method includes monitoring a plurality of communication channels to detect a failed communication channel. In response to detecting the failed communication channel, failover instructions are generated concerning an alternative communication channel. The failover instructions are provided to one or more client electronic devices.

According to a second implementation, a computer program product resides on a computer readable medium having a plurality of instructions stored on it. When executed by a processor, the instructions cause the processor to perform operations including monitoring a plurality of communications channels to detect a failed communication channel. In response to detecting the failed communication channel, the instructions cause the process to generate failover instructions concerning an alternative communication channel. The failover instructions are provided to one or more client electronic devices.

DETAILED DESCRIPTION OF THE INVENTION

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, or transport the program for use by or in connection with the instruction execution system, apparatus, or device. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
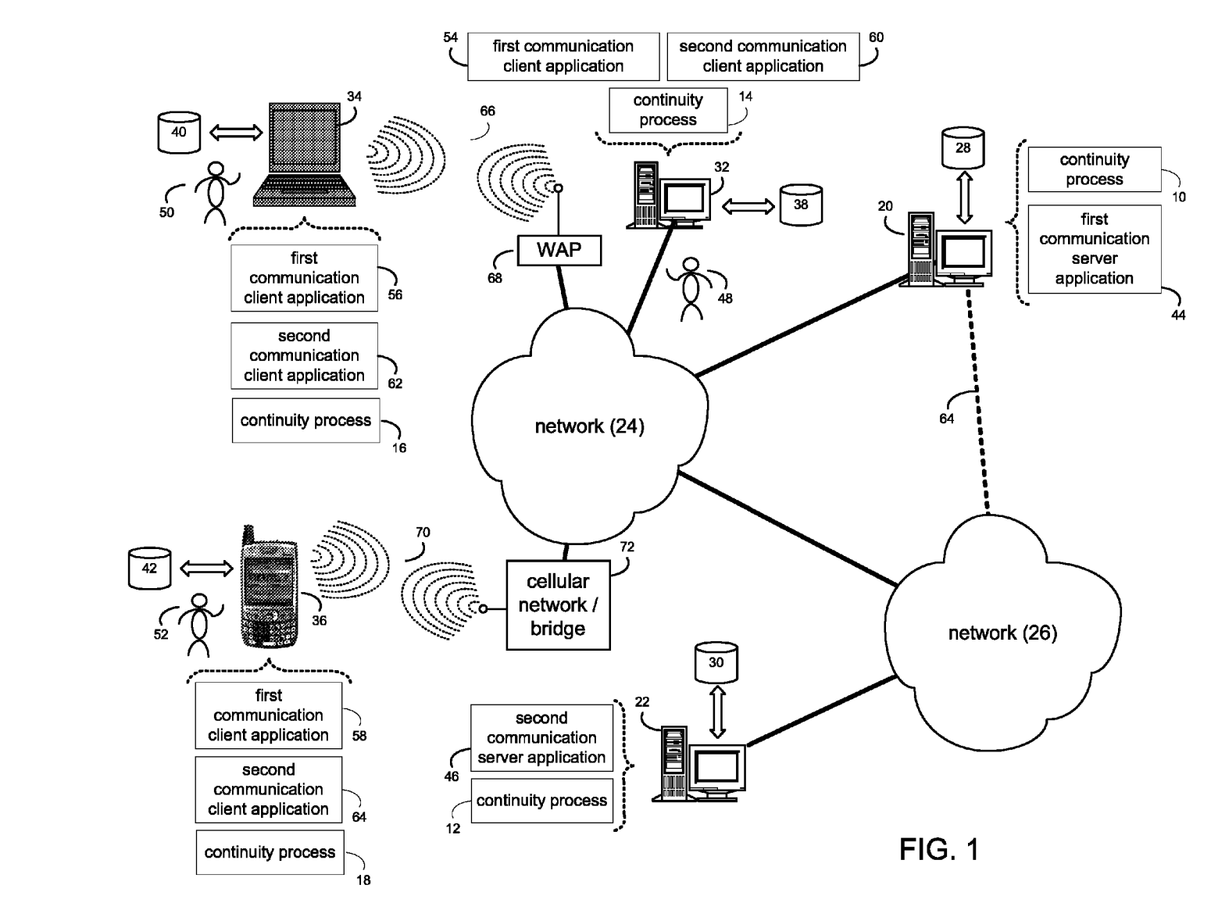
FIG. 1 is a diagrammatic view of a continuity process, a first communication application, and second communication application coupled to a distributed computing network.

Referring to FIG. 1, there is shown a continuity process. As will be discussed in greater detail below, the continuity process may monitor a plurality of communication channels to detect a failed communication channel. In response to detecting the failed communication channel, failover instructions may be generated concerning an alternative communication channel. The failover instructions may be provided to one or more client electronic devices.

The continuity process may be a server-side process (e.g., server-side continuity process 10, or server-side continuity process 12), a client-side process (e.g., client-side continuity process 14, client-side continuity process 16, or client-side continuity process 18), or a hybrid server-side/client-side process (e.g., the combination of one or more of server-side continuity process 10, 12 and one or more of client-side continuity process 14, 16, 18).

Server-side continuity processes 10, 12 may reside on and may be executed by server computers 20, 22 (respectively), which may be connected to networks 24, 26 (e.g., the Internet, a local area network, or a wide area network). Examples of server computers 20, 22 may include, but are not limited to: a personal computer, a server computer, a series of server computers, a mini computer, and a mainframe computer. Server computers 20, 22 may each be a web server (or a series of servers) running a network operating system, examples of which may include but are not limited to: Microsoft® Windows® XP Server; Novell® NetWare®; or Redhat® Linux®, for example (Microsoft and Windows are registered trademarks of Microsoft Corporation in the United States, other countries or both; Novell and NetWare are registered trademarks of Novell Corporation in the United States, other countries or both; Redhat is a registered trademark of RedHat Corporation in the United States, other countries or both; and Linux is a registered trademark of Linus Torvales in the United States, other countries or both), for example.

The instruction sets and subroutines of server-side continuity processes 10, 12, which may be stored on storage devices 28, 30 (respectively) coupled to server computers 20, 22, may be executed by one or more processors (not shown) and one or more memory architectures (not shown) incorporated into server computers 20, 22. Storage devices 28, 30 may include but are not limited to: a hard disk drive; a tape drive; an optical drive; a RAID array; a random access memory (RAM); and a read-only memory (ROM).

Server computers 20, 22 may execute a web server application, examples of which may include but are not limited to: Microsoft IIS, Novell Webserver, or Apache Webserver, that allows for HTTP (i.e., HyperText Transfer Protocol) access to server computers 20, 22 via network 24 and/or 26. Network 22 may be connected to network 26. Further networks 22, 26 may be connected to one or more secondary networks (not shown), examples of which may include but are not limited to: a local area network; a wide area network; or an intranet, for example.

Client-side continuity processes 14, 16, 18 may reside on and may be executed by client electronic devices 32, 34, 36 (respectively), examples of which may include, but are not limited to, personal computer 32, notebook computer 34, personal digital assistant 36, a data-enabled cellular phone (not shown), and the like. Client electronic devices 32, 34, 36 may each be coupled to network 24 and/or network 26 and may each execute an operating system, examples of which may include, but are not limited to, Microsoft Windows, Microsoft Windows CE, Redhat Linux, or a custom operating system.

The instruction sets and subroutines of client-side continuity processes 14, 16, 18, which may be stored on storage devices 38, 40, 42 (respectively), may be executed by one or more processors (not shown) and one or more memory architectures (not shown) incorporated into client electronic devices 32, 34, 36 (respectively). Storage devices 38, 40, 42 may include but are not limited to: hard disk drives; tape drives; optical drives; RAID arrays; random access memories (RAM); read-only memories (ROM), compact flash (CF) storage devices, secure digital (SD) storage devices, and memory stick storage devices.

In addition to server-side continuity processes 10, 12, server computers 20, 22 may each execute a communication server application (e.g., first communication server application 44, and second communication server application 46), examples of which may include, but are not limited to, an email server application (e.g., IBM® Lotus® Domino® Server and Microsoft Exchange® Server), an instant messaging server application (e.g., Lotus Sametime®, Microsoft Office Live Communications Server, Jabber XCP™, and AOL® Instant Messenger®), a paging server application (e.g., Air Messenger LAN Server, by Internet Software Solutions), and short messaging service server application (e.g., Microsoft ISA Server), or the like. First communication server application 44 and/or second communication server application 46 may allow users 48, 50, 52 to communicate with one another (e.g., exchange email messages, instant message, text messages, and the like) via communication client applications (e.g., first communication client applications 54, 56, 58 and second communication client applications 60, 62, 64), examples of which may include, but are not limited to, email client applications (e.g., Lotus Notes and Microsoft Outlook), instant messaging applications (e.g., AOL Instant Messenger, IBM Lotus Sametime, Google® Talk), or the like.

If the continuity process is configured as a server-side continuity process, server side continuity processes 10, 12 may be a stand alone application that interface with one or more communication server applications (e.g., with first communication server application 44 and/or second communication server application 46) or may be an applet/application that is executed within one or more communication server applications. Additionally, while first communication server application 44 and second communication server application 46 are shown residing on separate server computers 20, 22, the first and second communication server application may reside on, and be executed by, a single server computer. In that case, a single server-side continuity process may reside on the single server computer and may interface with one or more of the first and the second communication server applications. Further, in the case in which the first and the second communication server application reside on a single server computer, a server-side continuity process may be an applet/application that is executed within one or more of the first and the second communication server applications.

If the continuity process is configured as a client-side continuity process, client-side continuity processes 14, 16, 18 may be stand alone applications that interface with one or more of first communication client applications 54, 56, 58 and second communication client applications 60, 62, 64. Further, client-side continuity processes 14, 16, 18 may be applets/applications that are executed within one or more of first communication client applications 54, 56, 58 and second communication client applications 60, 62, 64.

The instruction sets and subroutines of first communication server application 44 and second communication server application 46, which may be stored on storage devices 28, 30 (respectively) coupled to server computers 20, 22 (respectively) may be executed by one or more processors (not shown) and one or more memory architectures (not shown) incorporated within server computers 20, 22.

The instruction sets and subroutines of first communication client applications 54, 56, 58 and second communication client application 60, 62, 64, which may be stored on storage devices 38, 40, 42 (respectively) coupled to client electronic devices 32, 34, 36 (respectively), may be executed by one or more processors (not shown) and one or more memory architectures (not shown) incorporated into client electronic devices 32, 34, 36 (respectively). Using first communication client applications 54, 56, 58 and/or second communication client applications 60, 62, 64, users 48, 50, 52 may access one or more of first communication server application 44 and second communication server application 46 (respectively) and may allow users 48, 50, 52 to communicate with one another, e.g., via email messages, instant messages, text messages, and the like.

Users 48, 50, 52 may access one or more of first communication server application 44 and second communication server application 46 directly through the device on which the communication client applications (e.g., first communication client applications 54, 56, 58 and second communication client application 60, 62, 64) is executed, namely client electronic devices 32, 34, 36, for example. Users 48, 50, 52 may access one or more of first communication server application 44 and second communication server application 46 directly through network 24 or through network 26. Further, server computers 20, 22 (i.e., the computers that execute first communication server application 44 and second communication server application 46) may be connected to network 24 through network 26, as illustrated with phantom link line 64.

The various client electronic devices may be directly or indirectly coupled to network 24 (or network 26). For example, personal computer 32 is shown directly coupled to network 24 via a hardwired network connection. Further, notebook computer 34 is shown wirelessly coupled to network 24 via wireless communication channel 66 established between notebook computer 34 and wireless access point (i.e., WAP) 68, which is shown directly coupled to network 24. WAP 68 may be, for example, an IEEE 802.11a, 802.11b, 802.11g, Wi-Fi, and/or Bluetooth device that is capable of establishing wireless communication channel 66 between notebook computer 34 and WAP 68. Personal digital assistant 36 is shown wirelessly coupled to network 24 via wireless communication channel 70 established between personal digital assistant 36 and cellular network/bridge 72, which is shown directly coupled to network 24.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

For the following discussion, server side continuity processes 10 is going to be described for illustrative purposes. However, this is not intended to be a limitation of this disclosure, as other configurations may be equally utilized, examples of which may include client-side continuity processes and hybrid client-side/server-side continuity processes, as well as other configurations which will be readily understood in view of the following discussion. Further, while server-side continuity process 10 has been shown and described residing on server computer 20 along with first communication server application 44, the server-side continuity process may reside on a separate server computer. Additionally, for the purpose of the following discussion, the first communication application (i.e., first communication server application 44 and first communication client applications 54, 56, 58) will be described as an instant messaging application, and the second communication application (i.e., second communication server application 46 and second communication client applications 60, 62, 64) will be described as an email application. However, this is also not intended to be a limitation of this disclosure, as the continuity process may be equally applicable to other combinations and variations of communication applications.

Figure 2:
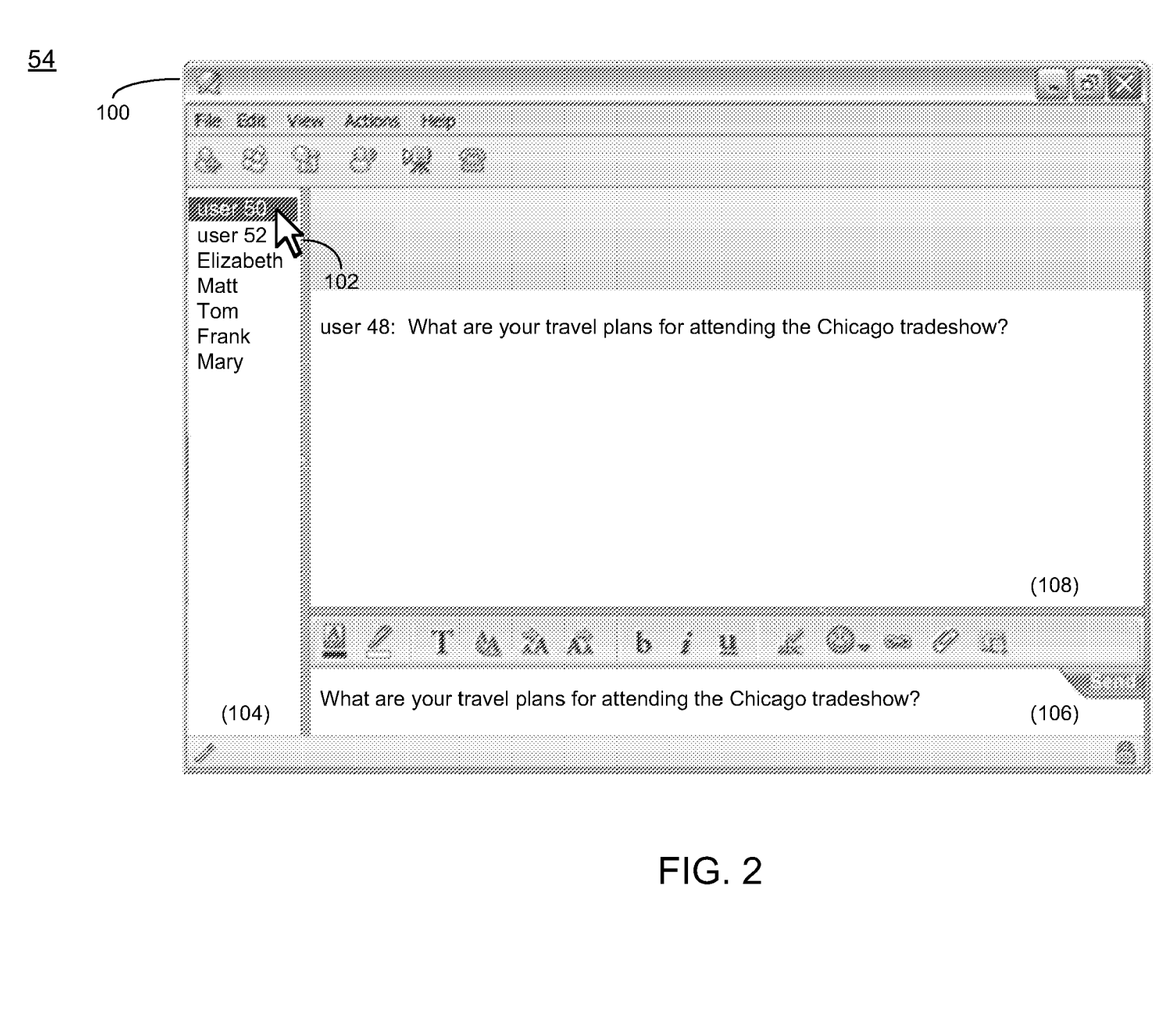
FIG. 2 is a diagrammatic view of a display screen rendered by the first communication application and/or the continuity process of FIG. 1.

For example, and referring also to FIG. 2, first communication client application 54 (alone or in combination with one or more of continuity processes 10, 14) may allow a user (e.g., user 48) to conduct instant messaging chats with one or more recipients through instant messaging visual interface 100. When conducting an instant messaging chat, user 48 may define a desired recipient, e.g., by selecting, via onscreen pointer 102 (which may be controlled by a pointing device such as a mouse; not shown) a desired recipient (e.g., user 50) from buddy list 104, inputting an instant messaging user ID (not shown) or the like. Once user 48 has selected user 50 as the desired instant messaging chat recipient, first communication client application 54 may allow user 48 to type desired instant message content in typing pane 106. For example, user 48 may type the message content:

What are your travel plans for attending the Chicago tradeshow?

The message content input by user 48 may appear in chat pane 108, along with the name of the poster (i.e., user 48).

Continuity process 10 may allow the instant message (i.e., "What are your travel plans for attending the Chicago tradeshow?") to be sent to user 50 over a communication channel other than an instant messaging communication channel. For example, and referring also to FIG. 3, continuity process 10 may monitor 150 a plurality of communication channels. In the context of the illustrated example, continuity process 10 may monitor 150 a first communication channel (e.g., an instant messaging communication channel) utilized by first communication server application 44 and first communication client applications 54, 56, 58. Additionally, continuity process 10 may monitor a second communication channel (e.g., an email communication channel) utilized by second communication server application 46 and second communication client applications 60, 62, 64. Continuity process 10 may similarly monitor various other communication channels. Continuity process 10 may detect 152 a failed communication channel. As used herein a failed communication channel may include a communication channel which is experiencing an outage and/or a communication channel which is in a saturation state (e.g., resulting in degraded performance). For example, continuity process 10 may detect 152 that the instant messaging communication channel (e.g., over which the instant message "What are your travel plans for attending the Chicago tradeshow?" was to be sent) has failed. In response to detecting 152 a failed communication channel (i.e., the instant messaging communication channel), continuity process 10 may generate 154 failover instructions concerning an alternative communication channel (e.g., allowing the instant message to be sent to user 50, notwithstanding the failure of the instant messaging communication channel). Continuity process 10 may provide 156 the failover instructions to a plurality of client electronic devices (e.g., client electronic devices 32, 34, 36), e.g., which may utilize one of the plurality of communication channels monitored by continuity process 10.

Figure 3:
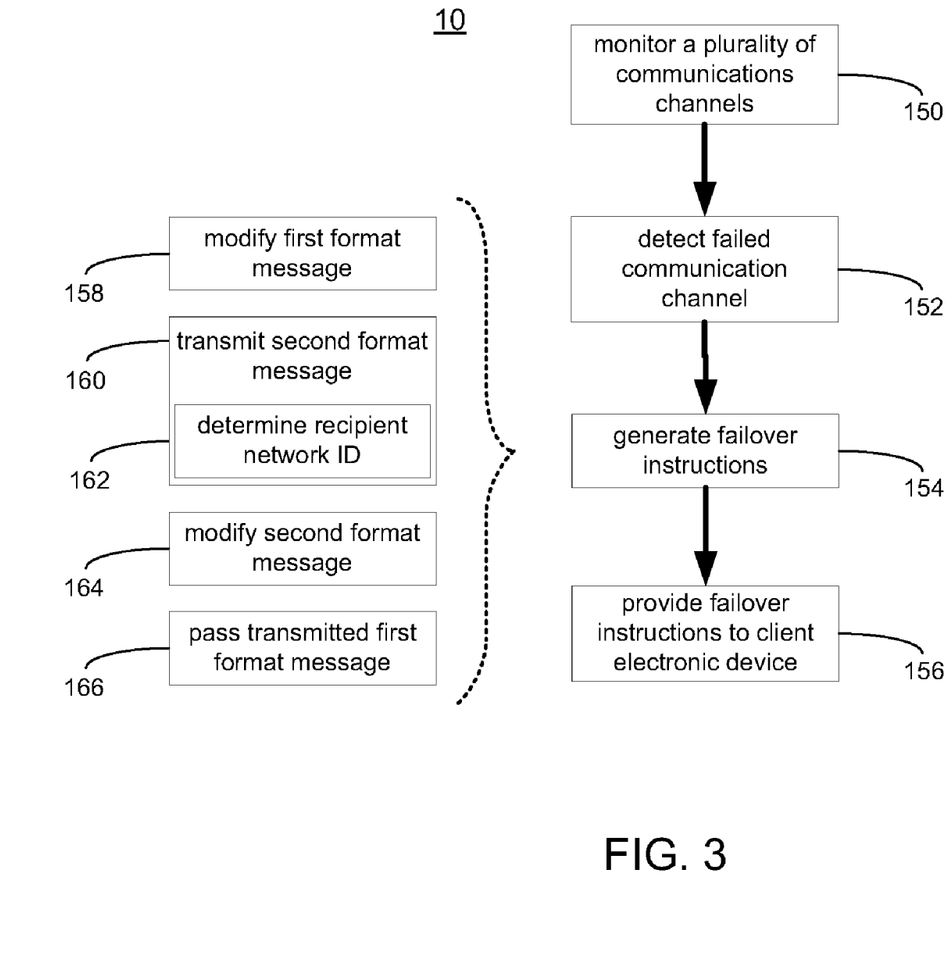
FIG. 3 is a flowchart of a process that may be performed by the continuity process of FIG. 1.

Continuing with the above-stated example, continuity process 10 may provide 156 the failover instructions to client electronic device 32, for sending the instant message over the alternative communication channel. The failover instructions may include instructions to modify 158 a first format message that was configured to be communicated over the failed communication channel into a second format message that is configured to be communicated over the alternative communication channel. For example, the instant message may be in an format configured to be transmitted between instant messaging client applications (e.g., between first communication client applications 54, 56 via first communication server application 44, which may be an instant messaging server application) utilizing appropriate instant messaging protocols (e.g., Session Initiation Protocol, "SIP", or the like). The failover instructions may include instructions for continuity process 14 and/or first communication client application 54 to modify 158 the instant message to create an email including the message "What are your travel plans for attending the Chicago tradeshow?".

Figure 4:
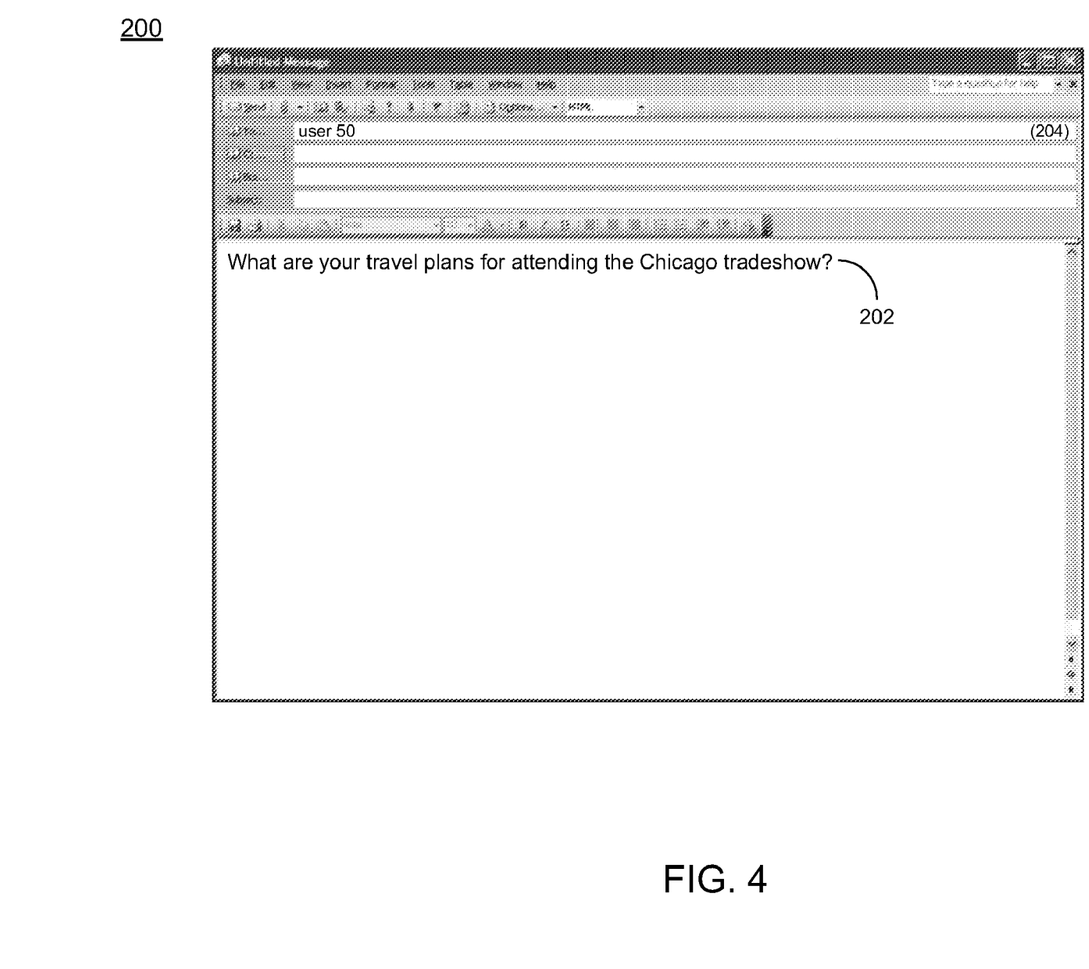
FIG. 4 diagrammatically depicts an email message generated by the continuity process and/or second communication application of FIG. 1.

For example, and referring also to FIG. 4, continuity process 14 (alone or in combination with one or more of first communication client application 54 and/or second communication client application 60, which may be an email client application) may generate email message 200. Email message 200 may be configured to be transmitted via an email communication channel (e.g., using Simple Mail Transfer Protocol, "SMTP", via second communication server application 46, which may be an email server application), and may include message content 202 (e.g. the body of the email message). Message content 202 may include the content of the instant message (i.e., "What are your travel plans for attending the Chicago tradeshow?") created via first communication client application 54. Additionally, email message 200 may include "TO" recipients field 204. Email message 200 may be addressed to user 50 (i.e., the intended recipient of the instant message "What are your travel plans for attending the Chicago tradeshow?") in "TO" recipients field 204.

The failover instructions may further include instructions to transmit 160 the second format message over the alternative communication channel. For example, in response to the provided 156 instructions, continuity process 14 (alone or in conjunction with one or more of first communication client application 54 and/or second communication client application 60) may transmit 160 email message 200 to user 50 via second communication server application 46. Email message 200 may be transmitted 160 to user 50 via conventional email protocols (e.g., Simple Mail Transfer Protocol, "SMTP"). For example, transmitting 160 the second format message may include transmitting 160 the second format message by a second messaging application configured to transmit/receive second format messages. Accordingly, second communication client application 60 (e.g., which may be an email client application) may transmit 160 email message 200 to user 50. Additionally/alternatively, continuity process 14, may include an email client application and/or module that may transmit 160 email message 200 to user 50.

The failover instructions to transmit 160 the second format message may include instructions to determine 162 a recipient network identification for second format messages. The second format message may be transmitted 160 to the recipient network identification. For example, user 50's instant messaging identification may be different than user 50's email address. In order to transmit 160 email message 200 to user 50, continuity process 14 may determine 162 user 50's email network identification (i.e., user 50's email address). One or more of continuity processes 10, 14 may determine 162 user 50's email address based upon, for example, information associated with user 50 via buddy list 104 of first communication client application 54 and/or first communication server application 44 (e.g., which may include user 50's name, instant messaging identification, email address, telephone number, etc.). Additionally/alternatively, one or more of continuity processes 10, 14 may determine 162 user 50's email address via a look-up in a corporate directory (not shown), a contacts list associated with second communication client application 60 (e.g., which may be an email client application including a contacts list), or similar source.

The failover instructions may further include instructions to modify 164 the second format message to form a transmitted first format message. The transmitted first format message may be based upon, at least in part, the second format message. For example, the failover instructions may cause one or more of continuity process 16, second communication client application 62 and/or first communication client application 56 (all of which may be executed on laptop computer 34) to modify 164 transmitted 160 email message 200 from the email format to an instant messaging format, e.g., to form an instant message including as message content "What are your travel plans for attending the Chicago tradeshow?". Email message 200 may include an indicator that the message is intended for delivery as an instant message (e.g., that the message originated as an instant message and was transmitted 160 via an email communication channel), which may for example, identify email message 200 as a second format message to be modified 164 to form a first format message. For example, email message 200 may include embedded data indicating that the message is intended for delivery as an instant message. Various additional and/or alternative indicators may be used, including, but not limited to, text included in the subject line, message body, etc., indicating intended delivery as an instant message, for example.

Continuing with the above stated-example, one or more of continuity process 16, second communication client application 62, and/or first communication client application 56 may monitor email received by second communication client application 62 for the presence of an indicator that the received email is intended for delivery via instant messaging. Based upon, at least in part, email mail message 200 including an indicator that email is intended to be delivered via instant messaging, one or more of continuity process 16, second communication client application 62, and/or first communication client application 56 may modify 164 transmitted email message 200 to form an instant message based upon, at least in part, transmitted email message 200.

Figure 5:
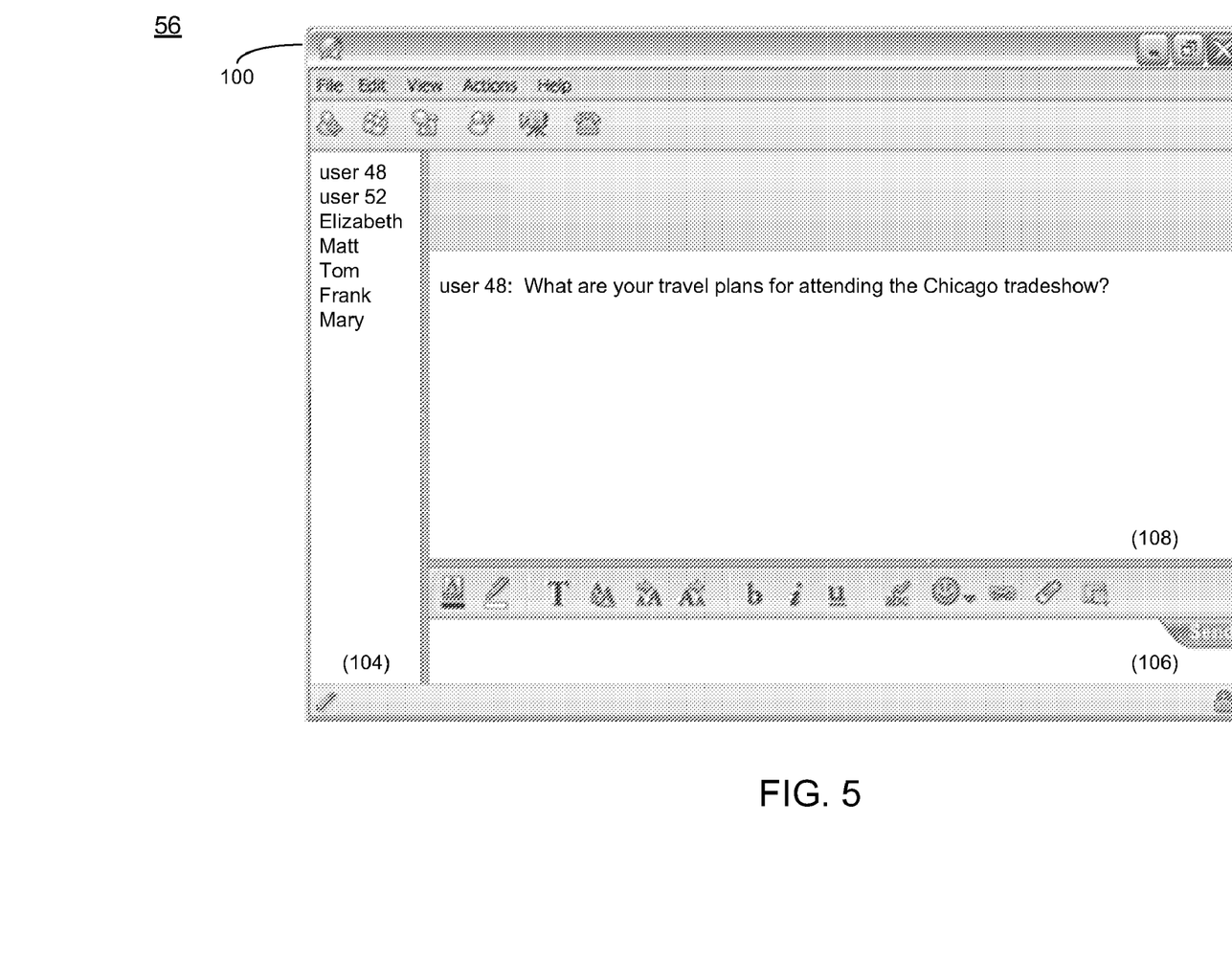
FIG. 5 is a diagrammatic view of a display screen rendered by the first communication application and/or the continuity process of FIG. 1.

The failover instructions provided 156 by continuity process 10 may further include instructions to pass 166 the modified 164 message to a first messaging application configured to transmit/receive first format messages. Continuing with the above example and referring also to FIG. 5, one or more of continuity process 16, second communication client application 62, and/or first communication client application 56 may pass 166 the modified 164 message (e.g., an instant message based upon, at least in part, email message 200) to first communication client application 56 (e.g., which may be an instant messaging client application). First communication client application 56 (alone or in conjunction with one or more of continuity process 16 and/or first communication server application 44) may render instant messaging visual interface 100. The modified 164 message (i.e., an instant message "What are your travel plans for attending the Chicago tradeshow?") may be displayed in chat pane 108. As such, the instant message generated by user 48 and transmitted via an email communication channel, may be delivered to user 50 for consumption as an instant message.

As discussed above, in the event of the failure of a communication channel (e.g., instant messaging) the use of an alternative communication channel (e.g., email) as a failover may result in an increased burden on the alternative communication channel. The burden on the alternative communication channel may optionally be controlled by limiting the messages and/or users for which the alternative communication channel may serve as a failover. For example, the use of the alternative communication channel as a failover may be limited to messages marked as having one or more specified priority levels. For example, the alternative communication channel may only be used as a failover for messages marked as "high priority". Similarly, the use of the alternative communication channel as a failover may be restricted to users above a specified position within an organization (e.g., department head or above). Various other controls may be implemented, depending upon design criteria and user need.

While the foregoing discussion was described in the context of an instant messaging failed communication channel and an email alternative communication channel, such description is intended only for the purpose of illustration, and should not be construed as a limitation of this disclosure. The failed communication channel and the alternative communication channel may include various different communication channels, systems, and protocols. For example, the failed communication channel may be an email communication channel, and the first format message may include an email. Similarly, the alternative communication channel may be an instant messaging communication channel, and the second format message may include an instant message. Various other communication systems may similarly be employed consistent with the foregoing disclosure.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method comprising:
   monitoring a plurality of communication channels to detect a failed communication channel;
   in response to detecting the failed communication channel, generating, by a continuity process executing on a computing device, failover instructions concerning an alternative communication channel; and
   providing the failover instructions to one or more client electronic devices, wherein the failover instructions include instructions for:
      modifying a first format message that was configured to be communicated over the failed communication channel into a second format message that is configured to be communicated over the alternative communication channel, wherein the second format message is based, at least in part, upon the first format message;
      transmitting the second format message over the alternative communication channel; and
      passing the transmitted first format message to a first messaging application configured to transmit/receive messages over the failed communication channel.

2. The method of claim 1, wherein the failover instructions further include instructions for modifying the second format message to form a transmitted first format message, the transmitted first format message based upon, at least in part, the second format message.

3. The method of claim 1, wherein the failover instructions for transmitting the second format message include instructions for transmitting the second format message by a second messaging application configured to transmit/receive messages over the alternative communication channel.

4. The method of claim 1, wherein the failover instructions for transmitting the second format message include instructions for determining a recipient network identification for second format messages, and transmitting the second format message to the recipient network identification.

5. The method of claim 1, wherein the first format message includes an instant message.

6. The method of claim 1, wherein the first format message includes an email message.

7. The method of claim 1, wherein the second format message includes an instant message.

8. The method of claim 1, wherein the second format message includes an email.

9. A computer program product comprising:
   a computer storage medium having computer usable program code embodied therewith, which, when executed by a processor, cause the processor to perform operations comprising:
   monitoring a plurality of communication channels to detect a failed communication channel;
   in response to detecting the failed communication channel, generating failover instructions concerning an alternative communication channel; and
   providing the failover instructions to one or more client electronic devices, wherein the failover instructions include instructions for:
      modifying a first format message that was configured to be communicated over the failed communication channel into a second format message that is configured to be communicated over the alternative communication channel, wherein the second format message is based, at least in part, upon the first format message;
      transmitting the second format message over the alternative communication channel; and
      passing the transmitted first format message to a first messaging application configured to transmit/receive messages over the failed communication channel.

10. The computer program product of claim 9, wherein the failover instructions further include instructions for modifying the second format message to form a transmitted first format message, the transmitted first format message based upon, at least in part, the second format message.

11. The computer program product of claim 9, wherein the failover instructions for transmitting the second format message include instructions for transmitting the second format message by a second messaging application configured to transmit/receive messages over the alternative communication channel.

12. The computer program product of claim 9, wherein the failover instructions for transmitting the second format message include instructions for determining a recipient network identification for second format messages, and transmitting the second format message to the recipient network identification.

13. The computer program product of claim 9, wherein the first format message includes an instant message.

14. The computer program product of claim 9, wherein the first format message includes an email message.

15. The computer program product of claim 9, wherein the second format message includes an instant message.

16. The computer program product of claim 9, wherein the second format message includes an email.

* * * * *